United States Patent [19]
Rendina

[11] Patent Number: 5,932,372
[45] Date of Patent: Aug. 3, 1999

[54] COMPOSITE MATERIALS, PROCESSES FOR MANUFACTURING THE COMPOSITES, COMPOSITE ELECTRODE, HYDROGEN OCCLUDING COMPOSITE, AND ELECTROCHEMICAL CELL UTILIZING THE COMPOSITE

[75] Inventor: David Deck Rendina, Vancouver, Canada

[73] Assignee: Lightyear Technologies Inc., Bellingham, Wash.

[21] Appl. No.: 08/775,873

[22] Filed: Jan. 2, 1997

[51] Int. Cl.$^6$ .................................................. H01M 4/58
[52] U.S. Cl. ................................. 429/218.1; 429/218.1; 428/570; 428/615; 420/900
[58] Field of Search ..................... 428/615, 570, 428/548, 619; 420/900; 429/218.1; 427/218.2

[56] References Cited

U.S. PATENT DOCUMENTS

| | | | |
|---|---|---|---|
| 4,847,174 | 7/1989 | Palmer et al. | 429/112 |
| 5,085,944 | 2/1992 | Ebato et al. | 428/570 |
| 5,441,826 | 8/1995 | Watanabe et al. | 429/101 |
| 5,763,085 | 6/1998 | Atarashi et al. | 428/403 |

FOREIGN PATENT DOCUMENTS

| | | |
|---|---|---|
| 5-283068 | 10/1993 | Japan . |
| 9-255301 | 9/1997 | Japan . |

*Primary Examiner*—Maria Nuzzolillo
*Assistant Examiner*—Carol Chaney

[57] ABSTRACT

Disclosed are new forms of composite materials, methods for preparing the composites, electrodes incorporating the composites, hydrogen occluding composites, and an electrochemical storage cell with a composite negative electrode.

53 Claims, 4 Drawing Sheets

Figure # I
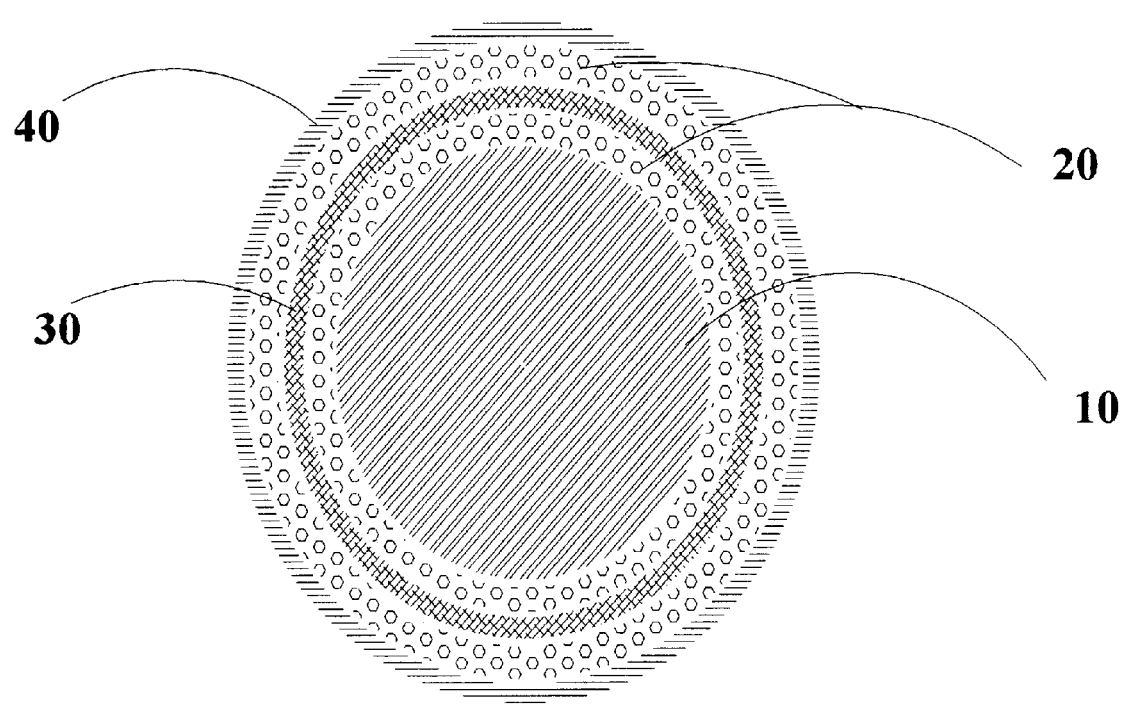

Figure # 2
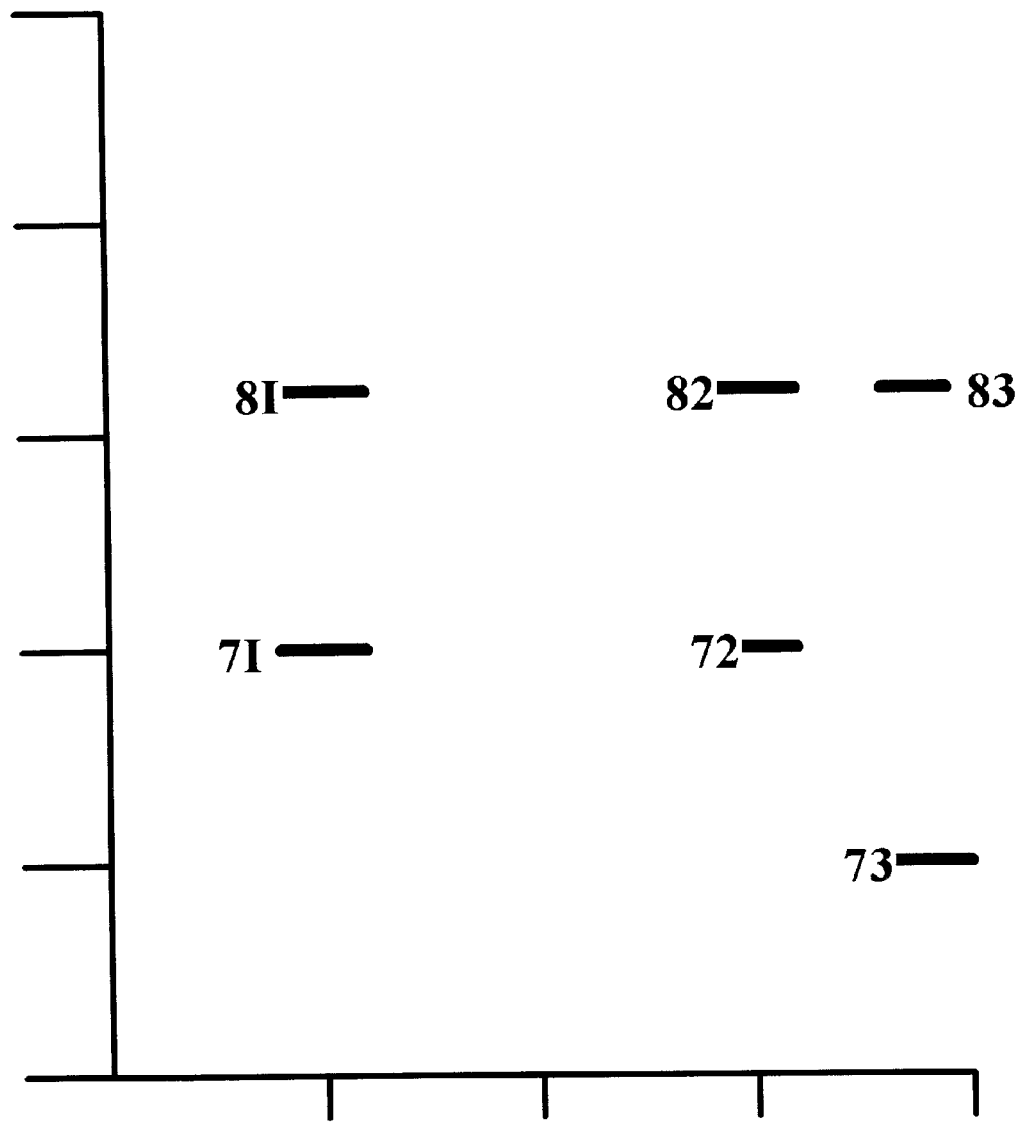

Figure # 3
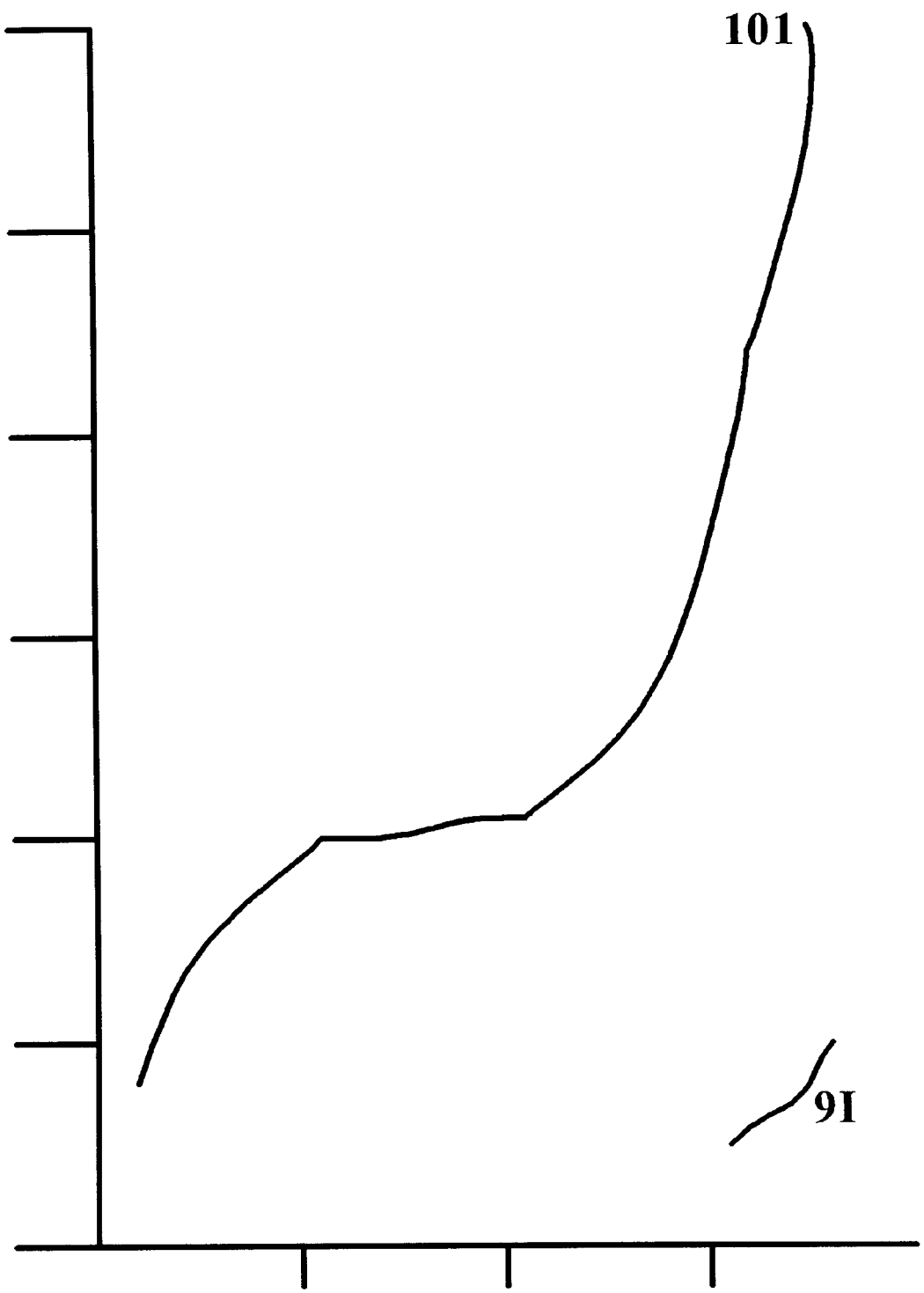

Figure # 4
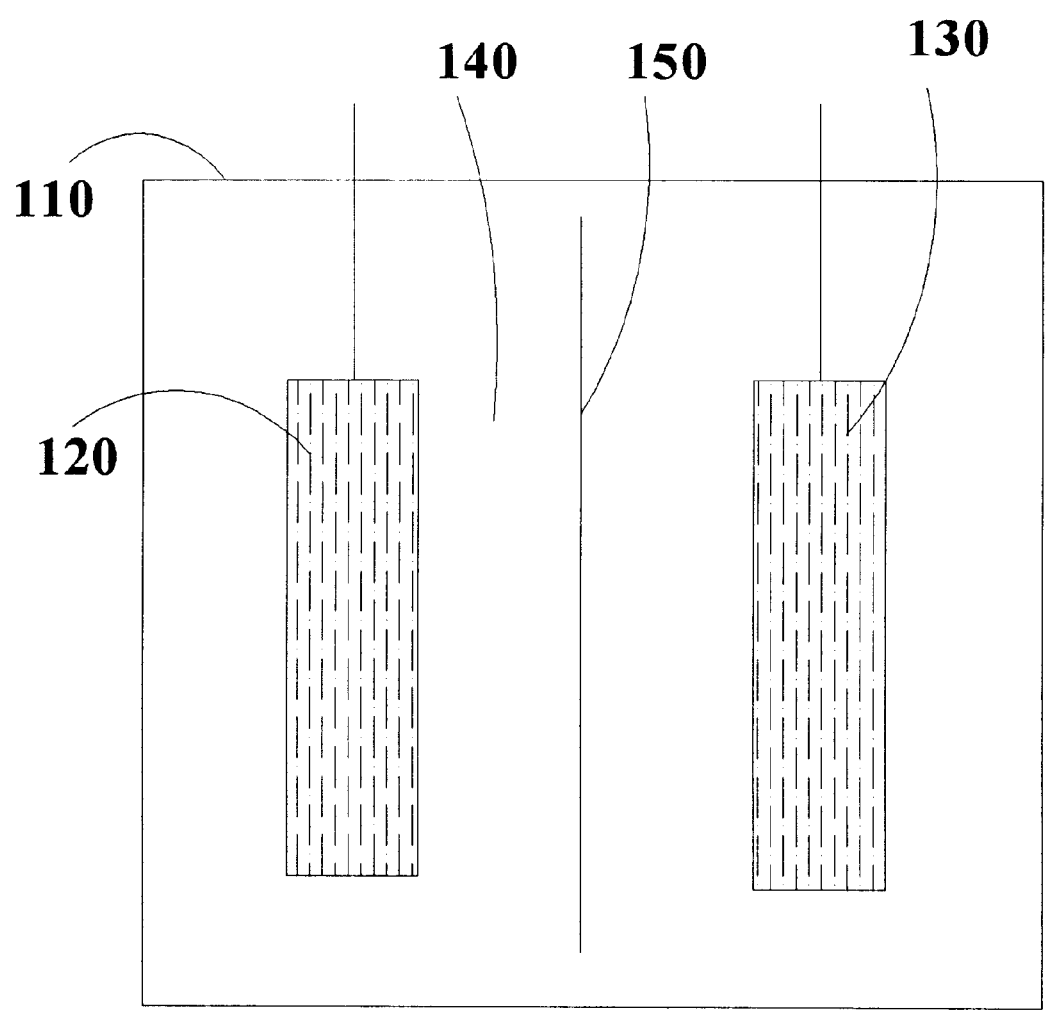

COMPOSITE MATERIALS, PROCESSES FOR MANUFACTURING THE COMPOSITES, COMPOSITE ELECTRODE, HYDROGEN OCCLUDING COMPOSITE, AND ELECTROCHEMICAL CELL UTILIZING THE COMPOSITE

TECHNICAL FIELD

This invention relates to composite materials, and methods for preparing composite materials, which exhibit superior performance as electrochemical storage materials and as hydrogen occluding materials, and electrochemical cells using these materials.

BACKGROUND OF THE INVENTION

Primary electrochemical cells that use the metals aluminum, lithium, magnesium, or zinc as a negative electrode, and rechargeable electrochemical cells that use an aluminum, cadmium, lead, lithium, magnesium, zinc, or metal hydride forming hydrogen storage alloy negative electrode are well known in the art. In fact these materials represent a large percentage of battery materials used in consumer and automotive batteries.

When electrochemical storage batteries which employ these materials are subjected to analysis to determine the cause of failure, it has been found that the failure mode is usually the result of degradation of the negative electrodes. This degradation has often been ascribed to dendrite formation which promotes internal shorting, and to the growth of an oxide or hydroxide film on the surface of the negative electrode. These surface films reduce the active area for the reduction/oxidation reaction to occur. Since the total current has to be distributed over a smaller total area, the current density on the active surface increases. As a consequence, the rate of formation of the irreversible film layer increases. The internal resistance of the electrode also increases, further hastening failure of the electrode.

Prior attempts to address these problems have focused mainly on the addition, through high temperature alloying, of more and more modifier elements to the electrochemnical storage material which makes up the negative electrode. For example, many current examples of metal hydride materials include ten or more components mixed in varying ratios. As with any alloy, adding new elements increases the complexity of the formation process, and adds to the cost of the overall material.

Accordingly, there exists a need to provide a means to reduce the formation of dendrites and of oxides and hydroxide films on the surface of negative electrodes of electrochemical cells. The means for reducing film formation should be relatively simple, and not necessitate the use of additional elements by high temperature alloying.

Methods for protecting the negative electrode in an electrochemical cell without alloying have been described in U.S. Pat. No. 4,315,829 by Duddy et al. in which lead electrodes are coated with a polymeric material in order to inhibit shedding, in U.S. Pat. No. 5,185,221 by Rampel in which hydride materials are coated with a relatively thick layer of carbon to inhibit the growth of oxide films, and U.S. Pat. No. 5,451,474 by Han Wu et al. where hydride materials are coated with a passivating layer of platinum or palladium to facilitate hydrogen adsorbtion and inhibit the growth of oxide an hydroxide films. Fauteux et al. in U.S. Pat. No. 5,434,021 describes a method by which dendrite formation on a lithium metal anode may be inhibited by coating with a polymer. However, none of the processes described, provide the fine degree of control, obtained in the instant invention, over the thickness of the protective passivating material which is crucial to the efficient flow of ions to the primary material, nor do they allow for the beneficial, composite characteristics made possible by the addition of inclusion materials within layers of the protective passivating material. Further, none of the methods disclosed describe processes by which a wide variety of common negative electrode materials may be induced to exhibit composite characteristics, such as both excellent electrochemical storage capacity and high resistance to corrosion, without high temperature alloying.

Hydrogen occluding materials such as metal hydrides have been suggested as suitable materials for the storage of hydrogen gas for future transportation applications.

One of the primary purposes of alloying materials with hydride forming metals to form gaseous hydrogen storage materials is to enhance interstitial spacing between the hydrogen occluding particles, thus enhancing the passage of hydrogen gas to the adsorption sites. Another of the primary purposes of alloying materials with hydride forming metals is to provide sites within the alloy which enhance its catalytic ability. The alloying techniques utilized to achieve these goals are complex and expensive. Accordingly a need exists to achieve these goals by less complex and expensive means.

In addition, hydrogen occluding materials may have significant potential in applications where the separation and recovery of gaseous hydrogen or hydrocarbons from mixed gaseous environments is desirable, such as in the recovery of waste hydrogen or unburned hydrocarbons in combustion exhaust streams or the like. However, metal hydrides used for storage of gaseous hydrogen are often highly reactive with atmospheric gasses such as nitrogen, oxygen, and carbon dioxide and must be reconditioned after exposure to these gasses, thus making the handling of these materials both expensive and difficult and there use in the separation and recovery of hydrogen from a mixed gas environment, impractical. Therefore, a need exists so that hydrogen occluding materials may be exposed to atmosphere and mixed gas environments, and utilized without reconditioning.

Over the past several years, metal hydride cells have gained widespread market acceptance due to the fact that they incorporate highly desirable performance characteristics. Examples of these desirable characteristics include high charge acceptance, relatively long-cycle life and operation over a wide range of temperatures. Each of these performance characteristics represent improvements over the nickel cadmium and other battery systems known in the prior art.

Typically, the metal hydride hydrogen storage alloy electrode is the negative electrode in a hydrogen storage system. The negative electrode material (M) is charged by the electrochemical absorption of hydrogen, and the electrochemical evolution of a hydroxyl ion. The reaction which takes place at the metal hydride electrode may be described according to the following formula;

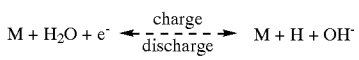

The reaction that takes place at the positive electrode of a nickel metal hydride cell is also a reversible reaction. In the case of a nickel oxy-hydroxide electrode, the positive electrode reaction is as follows;

$Ni(OH)_2+OH^- <--->NiOOH+H_2O+e^-$

The negative electrode of most metal hydride electrochemical cells can be characterized by one of two chemical formulas: The first is $AB_2$, which describes TiNi type battery systems such as described in, for example, U.S. Pat. No. 5,277,999. The second formula is $AB_5$ which describes $LaNi_5$ type systems as described in, for example, U.S. Pat. No. 4,487,817.

However, the power density of metal hydride cells is not as great as in some other types of cells, notably nickel cadmium. Accordingly, metal hydride cells have not been appropriate for several applications, such as power tools. Therefore, a needs exists for metal hydride cells having relatively high power densities and capacities.

The inventor has discovered that all of these goals may be achieved by the composite materials revealed.

A crucial element for the manufacture of the composite relies on the ability of one component of the composite to form defined layers of a specific molecular thickness, within which various materials may be included, while homogeneously dispersed in a suspension, prior to compounding with another component of the composite which acts as the primary electrochemical or hydrogen storage material.

Dines et al. in U.S. Pat. Nos. 4,299,892, and 4,323,480, and Morrison et al. in U.S. Pat. Nos. 4,853, 359 describe methods whereby a layer or layers of a transition metal di- and poly-chalcogenides, formed in a homogenous layered suspension may be applied to a support substance selected from the oxides or hydrous oxides of various elements. Further, Dines describes the beneficial characteristics which may be achieved when these materials are utilized as cathodes, that is, as the positive electrode, in lithium cells. Miremadi and Morrison in J. Appl. Phys.67(3), Feb. 1, 1990 describe how alternating layers of dissimilar layered dichalcogenides with and without an inclusion material may be stacked and supported by an oxide substrate. The rational stated, behind using oxides or hydrous oxides as support structures, was that the negatively charged layered dichalcogenides would adhere to the positively charged oxide or hydrous oxide.

This method of forming a bond between opposite charged materials, limits the range of materials which may be compounded and it would be beneficial if alternate methods which allow a more diverse group of materials to be compounded could be developed. Further, none of these methods teaches the benefits to performance that are achieved by compounding the materials, within these layered suspensions, with the wide variety of electrochemical anode and hydrogen occluding materials described in the present invention.

Divigalpitya et al. in U.S. Pat. Nos. 4,996,108 and 5,279, 720 describes methods by which a metal dichalcogenide may be applied as a single layer film to various substrates and methods for electrodepositng these materials. Winter et al. in U.S. Pat. No. 5,425,966 discloses methods for producing thin film coatings of selected dichalcogenides through chemical vapor deposition.

However, they do not describe the cost effective methods revealed in the instant invention for compounding the various components of the composites disclosed, by mixing in a manner by which a precise thickness of the layered materials may be applied, nor do they disclose the methods described in the instant invention for enhancing the adhesion of materials within the composite to each other through the application of various heat treatments. Further, none of the methods previously described, reveal processes by which successive layers of these materials with different inclusions contained within the layers may be applied to a substrate, nor do they disclose methods by which materials that are reactive with water, such as metal hydrides, may be compounded with layered materials which have been homogeneously dispersed in water.

SUMMARY OF THE INVENTION

Briefly, according to the invention, composite materials, methods for preparing the composite materials, an improved composite electrode material, an improved composite hydrogen occluding material, and an electrochemical cell utilizing a composite electrode are disclosed.

The composite material, in all forms, has two common components; a primary material (P), and a passivating material (Q). A third component, referred to as inclusion materials (Y), may also be included within layers of the passivating material. These inclusion materials may be dissimilar, for example, the composite may be formed with both, or either, metallic and organic inclusions. Successive layers of (Q) with or without (Y) included between the layers may be applied to (P) to form the composite. The material utilized in successive layers of passivating material may be dissimilar forms of (Q), for example a layer of passivating material comprised of $WS_2$ or a combination of $WS_2$ and $MoS_2$ may be applied atop a layer of passivating material comprised of $MoS_2$. A fourth component (R) may be added as a surface modifier to the final surface of the composite.

The primary material (P) provides, by far, the greatest proportion of material of the composite. It is the primary electrochemical storage, and/or hydrogen occluding component of the composite and may be selected from an element, or a combination of elements, a hydride of an element, or an alloy of elements, chosen on the basis of the materials' ability to perform as the negative electrode in an electrochemical cell, or to perform as a hydrogen occluding material capable of reversibly adsorbing and discharging hydrogen, or in the case of a metal hydride electrode, exhibiting both the ability to perform as the negative electrode in an electrochemical cell and reversibly occlude hydrogen.

More specifically, the material (P) may be chosen from the groups;

alkaline-earth metals, such as magnesium and calcium, rare earth elements, such as cerium, lanthanum, and ytterbium, metals, such as aluminum, and lead, transition metals, such as zinc, cadmium, and others, combinations of elements from the above groups, hydrides of elements from the above groups—alkaline earth metals, such as magnesium hydride and calcium hydride,—rare earths, such as lanthanum hydride, cerium or misch metal hydride,—metals, such as aluminum hydride,—transition metals such as titanium hydride, zirconium hydride, and others, or alloys of elements from the above groups, such as $AB_2$ and $AB_5$ Laves phase alloys, or others.

A powder is a preferred form of the primary material. Although powder particles of any size may be compounded, preferred particle size of the powdered material will most often be in the approximate range of between 500.0 and 0.1 microns in diameter. In all composites where metal hydrides or metal hydride alloys are employed as the primary material, powdered nanocrystalline particles are preferred due to their resistance to further cracking from hydrogen embrittlement.

According to the instant invention, the primary material is compounded, with a layer or layers, of a passivating material, (Q), or a combination of passivating materials, (Q), which have been homogeneously dispersed in layers, suspended in a solution.

The preferred layerd materials are metal dichalcogenides.

Although not wishing to be bound by any particular theory, the inventor believes that the principal property which determines many of the beneficial characteristics demonstrated by the passivating material is the ability of the material selected, to form into clearly defined layers, with a thickness of between one and approximately one hundred molecules per layer, within a solution. It is believed, that when compounded with the primary material, this ability allows the passivating material to conform, to a high degree, to the irregular surface of the primary material, and thus provides complete coverage and a high degree of protection to the primary material. This ability also allows the passivating material to be applied in thickness' which do not unduly inhibit the diffusion of ions or selected gases to the primary material of the composite.

In order to assure this quality, it is preferred that the passivating material forms into layers of a single molecule thickness while in suspension. Therefore, materials such as the metal dichalcogenides $MoS_2$, and $WS_2$, which can be induced, by known methods, to form defined layers of a single molecule thickness within a solution are preferred. However, other materials including, but not limited to, $NbS_2$, $TaS_2$, $TiS_2$, $VS_2$, and other di- or poly-chalcogens, or other materials which can be induced to form defined layers of between one and one hundred molecules thickness while suspended in a solution may be used.

The material may be amorphous or crystalline. In one preferred embodiment, the layer of passivation material may be hydrogen permeable, and may further prevent or reduce the growth of dendrites and the formation of oxides and hydroxides on the surface of the composite material.

Thus (Q) may be defined as a homogenous dispersion of a layered material, said dispersed material being separated into defined layers while suspended in a solution, wherein the defined layers correspond to a thickness of between one and one hundred molecules of said layered material.

The methods utilized for preparing the layered passivating material (Q) into defined layers while suspended in a solution may include any methods known in the art and are beyond the scope of this application, however, the exfoliated transition metal dichalcogenides which make up the preferred passivating materials are single layer materials of the form $MX_2$, where $MX_2$ is a layer-type dichalcogenide such as $MoS_2$, $NbS_2$, $TaS_2$, $TiS_2$, $WS_2$, $VS_2$, or the like, exfoliated by intercalation of an alkali metal in a dry environment such that the alkali metal is substantially intercalated between the layers of the $MX_2$, immersing the intercalated $MX_2$ in a reducible hydrogen generating solution to thereby cause the layers of $MX_2$ to separate and to form a homogenous dispersion. Selenium may replace sulfur as the dichalcogen.

Alternately, the passivating material may be a material removed from a homogenous dispersion of dichalcogenides of the form $MX_2$ of Group I Vb, Vb, molybdenum and tungsten, preferably molybdenum, titanium, niobium, and vanadium of sheet conformation having a "rag-like" structure representing a system consisting of single or several stacked but randomly folded and disordered layers or sheets having dimensions corresponding to about 6.2 to 62.0 angstroms in thickness about 500 angstroms minimum length and about 500 angstroms minimum width. This structure can be broadly likened to a stack of polymer sheets wherein each sheet is one atom thick, and are prepared by the controlled heating of amorphous $MX_2$ obtained by the nonaqueous low temperature percipitaion of $MX_2$ from mixtures of the metal salt and sources of sulfur, selenium or tellurium.

The novel composite material thus produced, wherein the preferred materials are utilized to form the composite, could best be described as having the form P:(Q)n wherein P is a substance selected from the group consisting of alkaline earth metals, rare earths, metals, transition metals, including combinations, hydrides, and alloys thereof, and Q is a homogenous dispersion of a layered material, said dispersed material being separated into defined layers while suspended in a solution, wherein the defined layers correspond to a thickness of between one and one hundred molecules of said layered material, and n is a number corresponding to the number of layers of Q compounded.

The composite material thus produced may be pressed, rolled, mixed with binders or other materials to form a paste, or modified by other means known in the art, to form into sheets, plates, foils, films, or other shapes suitable for the application chosen.

The composition of the passivating material may be modified, by known methods, by inclusion materials (Y) such as metallocenes,dyes, liquid crystals, monomers, carbonyls, soluble hydrides, organic solutes, and precipitates formed from soluble salts such as metal nitrates, sulfides, and chlorides, or other materials which may be precipitated, adsorbed, or entrapped, within layers of the passivating material and then applied to the primary materials.

It may be desirable in certain applications for successive layers of the same or dissimilar forms of the passivating material (Q) with or without the same or dissimilar inclusion materials (Y) between layers of the passivating material, to be compounded with a primary material (P).

In addition it may be desirable to modify the surface of the composite in order to, for example, enhance catalytic properties, improve component binding, further enhance the reduction of film formation, improve electrical conductivity, or for other reasons. The said surface modifier (R) may be selected from the group consisting of $MX_2$, where $MX_2$ is a layer-type dichalcogenide such as $MoS_2$, $NbS_2$, $TaS_2$, $TiS_2$, $WS_2$, $VS_2$, or the like, or F where F is an element, an organic compound, or metallic compound, coating applied to the surface of the composition. Methods for applying (R) to the composite are dependant on the materials selected to form the composite and on properties of the material selected for (R). However, it is believed that any of the methods known to be suitabe for applying a specific type of coating such as by brushing, spraying, pressing, electrodeposition, rolling, sputtering, vacuum or vapor deposition, may be used.

The novel composite materials thus produced are best described as taking the form P:(Q)n:(Q:Y:Q)x:R wherein P is a substance selected from the group consisting of alkaline earth metals, rare earths, metals, transition metals, including combinations, hydrides, and alloys thereof, and Q is a material removed from a solution containing a homogenous dispersion of a said material Q, said dispersed material being separated into defined layers, wherein the defined layers correspond to a thickness of between one and one hundred molecules of said dispersed material, and Y is an inclusion material precipitated, adsorbed, or entrapped between layers of Q, and R is a material applied as a surface modifier to the final surface of the composite, and where n is a number corresponding to the number of layers of Q, x is a number corresponding to the number of layers of Q:Y:Q, and where n can equal zero when x is at least one.

Further, according to the invention, there are provided methods for producing the composite with a primary material and a passivating material. In addition, there is provided a method for producing the composite with a primary material and a passivating material with inclusion materials between layers of the passivating material. There is also provided, a method for producing the composite with a primary material, and successive layers of the same or dissimilar forms of passivating material with or without inclusion materials between the layers of the passivating material, wherein the inclusion materials may be the same or dissimilar materials.

Further according to the invention, there are provided methods for applying a finishing layer of material to the final surface of the composite.

A method is also disclosed by which the adhesion of dissimilar material components of the composite to each other may be enhanced.

Also provided, is a method by which the composite may be produced utilizing a primary material which is reactive with water and a homogenous dispersion of passivating material suspended in water.

Also, according to the instant invention, there is provided an improved electrode utilizing the composite material.

Further, an improved hydrogen occlusion material suitable for use as a storage medium for hydrogen gas is disclosed.

Further according to the invention, there is provided an electrochemical storage cell including a negative electrode comprised of the composite material of the instant invention, seperated by a suitable material from a positive electrode, and an electrolyte.

BRIEF DESCRIPTION OF THE DRAWINGS

In drawings which illustrate specific embodiments of the invention, but which should not be construed as restricting the spirit or scope of the invention in any way;

FIG. 1 illustrates a conceptual diagram of the form of the composite material.

FIG. 2 illustrates a graph depicting the comparative performance of a composite electrode and a similarly constructed lanthanum nickel hydride electrode, wherein the vertical axis represents capacity in milliamp hours/gram, and the horizontal axis represents the number of charge/discharge cycles.

FIG. 3 illustrates a graph depicting the comparative performance of a composite hydrogen occluding material and magnesium hydride after both materials had been exposed to similar atmospheric conditions, wherein the vertical axis represents percentage by weight of hydrogen occluded and the horizontal axis represents temperature.

FIG. 4 illustrates an elecrochemical storage cell with composite negatve electrode.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring to FIG. 1, there is depicted a representation of the preferred embodiment of the composite material comprised of a primary material 10, layers of passivating material 20, inclusion materials 30, and a finishing material 40.

Accordingly, the primary material 10 may be either an element, combinations of elements, hydrides of elements, or alloys of elements from the groups alkaline earth metals, rare earths, metals, transition metals. Preferably the elements, or combinations containing the elements magnesium, lanthanum, aluminum, lead, cadmium, zinc—hydrides of the elements magnesium, cerium, lanthanum, misch metal, aluminum, titanium, zirconium, zinc—or the $AB_2$ or $AB_5$ Laves phase metal hydride, hydrogen occluding alloys. The metal hydride hydrogen occluding alloy materials may also be characterized by the following formula: $(Ti_{2-x}Zr_xV_{4-y}Ni_y) 1_{-z} M_z$ wherein M is a modifier element selected from the groups materials, including chromium, cobalt, manganese, aluminum, iron, iridium, molybdenum, and combinations thereof and where x, y, and z indicate the relative proportion of each of the materials in the alloy.

Compounded with the primary material are layers of passivation material 20. Preferred materials for use as the passivation material 20 include exfoliated $MoS_2$, $NbS_2$, $TaS_2$, $TiS_2$, $VS_2$, and $WS_2$, and combinations thereof Selenium may replace sulfur as the dichalcogen. Other layered materials may be used. It is most preferred that the passivating material is exfoliated $MoS_2$ and that the material is exfoliated in water due to the excellent production rates of single layer suspensions achieved by this method, the demonstrated ability of this material to accept inclusion materials between suspended single layers, as well as the reduced cost associated with the use of water in the exfoliation process. Further, it is believed that single layer suspensions promote better component adhesion and superior passivation properties than do multi-layer suspensions. This may be due to ability of single layers to more readily conform to the irregular surface of the primary materials.

The preferred methods for the preparation of these exfoliated materials is described by Morrison et al in U.S. Pat. No. 4,822,590, other methods may be used. The materials may be exfoliated in water, or they may be exfoliated in a suitable reducible hydrogen generating solution such as methanol, or alcohol to avoid reaction with materials to be compounded or included. Alternatively, the passivating material may be an amorphous di or poly chalcogenide homogeneously dispersed in an aprotic solution. Methods for producing these materials have been described by Dines et al. in U.S. Pat. No. 4,299,892 and U.S. Pat. No. 4,323,480.

The preferred number of the layers (n) of passivating material is dependent on the application for which the composite is produced, the nature of the primary material, and the degree of passivation required. In general it is evident that the amount of passivation material required for electrode applications is usually greater than the amounts required for hydrogen storage applications.

For electrode applications where single layer $MoS_2$ is utilized as the passivating material, it is preferred that the passivating material is applied to the primary material to a thickness of between approximately 6.2 angstroms to approximately 6200.0 angstroms corresponding to (n)=1 to (n)=1000, and most particularly preferred that the thickness of layered passivating material be between approximately 62.0 angstroms and 620.0 angstroms and correspond to approximately (n)=10 to (n)=100 layers of the preferred passivating material. For hydrogen storage applications where single layer $MoS_2$ is the passivating material (Q), it is preferred that the passivating material is applied to the hydrogen occluding primary material to a thickness of between approximately 6.2 angstroms and 620.0 angstroms and corresponding to (n)=1 to (n)=100 and most particularly preferred that the thickness of the layered passivating material be between approximately 6.2 angstroms and 124.0 angstroms corresponding to approximately (n)=1 to (n)=20 layers of the preferred passivating material.

Further according to the instant invention, the passivating material 20 may be modified, by known methods, while still in suspension, to improve performance by inclusion materials 30 such as metallocenes, dyes, monomers, liquid crystals, carbonyls, soluble hydrides, organic solutes, and precipitates formed from soluble salts such as metal nitrates, sulfides, and chlorides, or other materials which may be precipitated, adsorbed, or entrapped, within layers of the passivating material and then applied to the primary materials.

Although the addition of inclusion materials is not essential to the invention, these inclusion materials 30 may perform many useful functions. For example, metallic inclusions may be used to promote hydrogen catalyization, or reduce stress, or enhance conductivity. Polymerizing inclusions may be used to enhance particle binding, or reduce dendrite growth. After compounding with the primary material, a composite with metallic or polymerizing inclusions may be heated to convert the inclusion to the metal or to polymerize the inclusion.

The inclusion materials 30 are typically about one or two molecular layers thick, often forming a bi-layer between layers of the passivating material and may be irregularly spaced between successive layers of the passivating material.

According to the instant invention, different inclusion materials may be precipitated, adsorbed, or entrapped between successive layers of passivating material. Heat treatments are utilized between the application of each successive layer of passivating material both to remove the solvent and to enhance the adhesion of the components of the composite. For example, layers of passivating material (Q) with metallic inclusions (Y), such as nickel, cobalt, and copper, may be compounded with the primary material in successive applications of (Q:Y:Q), with heat treating or drying in between the application of each successive layer of passivating material. The compounded material thus formed may be heat treated by suitable methods, such as annealing in a reducing gas atmosphere, and successive layers of passivating material with carbon or organic polymerizing inclusions, such as styrene, and methyl methacrylate may be applied. The composite thus formed may be heated at a suitable temperature to polymerize the inclusions and a successive layer or layers of passivating material with or without inclusions may be applied. A highly ordered composite with numerous inclusion materials may be built up in this manner.

A finishing material 40 may be applied to the final surface of the composite in order to promote a particularly desirable surface characteristic. Finishing materials 40 may be applied by various means such as brushing, electroplating, pressing, spraying, sputtering, and vacuum or vapor deposition. Platinum and palladium applied by vacuum deposition are particularly preferred for hydride materials. The final composite may be heated to evolve the metal.

METHOD FOR PRODUCING A COMPOSITE OF THE FORM: P:(Q)n

The preferred method for producing a composite comprised of a primary material and a passivating material involves the following steps;

1. Prepare a sample of the selected primary material with a known surface area.
2. Remove any surface oxides or contaminants from the primary material.
3. Prepare a sample of a homogeneously dispersed layered passivating material in solution.
4. Calculate the amount of homogeneously dispersed layered material required to cover the primary material to the thickness desired according to the formula $$X = S(T)n$$

Where X is the amount of passivating material to be compounded.
Where S equals the estimated surface area of the selected primary material.
T equals the approximate thickness of a single molecule of the selected passivating material.
(n) equals the number of layers of passivating material desired.

5. Apply the passivating material to the primary material by mixing the prepared materials.
6. Dry to form the composite and to remove the solvent.
7. An optional heat treatment may be utilized at this stage to enhance the bonding of one component of the composite to another.

When forming the composite with materials which react with the selected solvent, for example magnesium hydride reacts with water, which is the preferred solvent for single layer $MoS_2$ passivating material, both the passivating material and the primary material should be submerged in a nonaqueous anhydrous solvent prior to the application of the passivating material.

Typical nonaqueous anhydrous solvents which may be used are acetonitrile, benzonitrile, propionitrile, alkyl halides of from 1 to 20 carbon atoms, arylhalides of from C6 to C20 carbon atoms, 1,2,dimethoxyethane, diglyme, n-methylformamide, dimethylformamide, esters of from C4 to C8, aromatics of C6–C20 carbons, preferably C6 to C12, most preferably benzene, pyridine, sulfolane, tributylphosphate, anhydrous acids such as formic acid, glacial acetic acid, propylene carbonate, tributylphosphate, dimethylsulfite, C1–C30 amines, preferably C1–C20, C5 to C12 alkanes, preferably C5–C8, such as hexane. The alkyhalides are preferably from C1 to C5 and the arylhalides are preferably from C6 to C10.

A more detailed description of the process is described in example 1 below;

EXAMPLE 1

The Preferred Method for Forming the Composite—P:(Q)n
A sample of industry standard magnesium shavings, obtained from Magcan Inc., of High River Alberta, was crushed in a shatterbox for 5 minutes and then ball milled under argon for 18 hours, the material was sieved, and particles with an average size of less then 45.0 microns were placed in a 50 cc stainless steel container connected to pressure and temperature monitors.

In order to remove any surface oxides and contaminants, the sample was first placed under vacuum and heated to 380° C. for 12 hours for clean up and outgassing. Next the sample was allowed to cool to ambient temperature of approximately 20° C. and exposed to hydrogen gas at 34 Atm. The temperature of the sample was then raised in intervals of 20° C./min. while continuously shaking the container. A slow diffusion of hydrogen into the sample was observed at about 285–290° C. At the first indication of hydrogen diffusion the procedure was stopped and the sample was again allowed to cool to 20° C. and evacuated. The procedure was repeated several times with similar results, and it was assumed that any oxides or contaminants on the surface of the material would have been substantially reduced.

Alternate methods, which are known in the art to be suitable for removing surface contaminants, may be used and may include acid or alkaline washing.

The sample was transferred to a glove box and removed from the container under argon. A 250 milligram sample of the magnesium powder was submerged in 10 ml of hexane in a 40 ml bottle.

An as received 2 gram sample of $MoS_2$ obtained from Materials Research Corporation was prepared in a glove box under argon and suspended in 25 ml of 2.5M solution of nbutylithium in hexane in a 50 ml container and allowed to settle for approximately 48 hours. The sample was removed from the glove box to a fume hood and the excess nbutylithium solution was decanted. Deionized distilled water was added. A gas, assumed to be hydrogen, was evolved and allowed to dissipate. The sample container was sealed and repeatedly shaken. Any gas evolved was allowed to dissipate.

In order to remove any lithium which might remain, the suspension was centrifuged three times for 20 minutes at 3,000 rpm. After each centrifuging the water was decanted and fresh distilled water was added. After the third centrifuging a portion of the sediment remaining was removed for x-ray diffraction which confirmed the single layer "exfoliated" structure. Distilled water was again added and the sample was shaken to form a suspension. The suspension was allowed to settle after which it was again centrifuged for 20 minutes followed by 20 minutes ultrasonication. The pH of the material was measured and found to be neutral.

Twelve drops (0.4 ml) of the single layer $MoS_2$ suspension thus produced, containing 8 mg of $MoS_2$, was added to the 40 ml bottle containing the magnesium powder immersed in hexane. The single layer $MoS_2$ did not readily bond to the magnesium but gathered at one corner of the bottle. The mixture had to be agitated with a stainless steel spatula for 5–6 minutes to homogenize the black mass. The clear clean hexane was decanted and the remaining material was dried under vacuum overnight to form the composite.

Composites were formed by the methods described above incorporating representative samples of primary materials from each of the following groups;

the alkaline-earth metals such as magnesium and calcium,—rare earths, such as cerium misch metal,—metals, such as aluminum, and lead,—transition metals, such as zinc, and cadmium, combinations of elements from the above groups such as mixtures of zinc and magnesium, hydrides of elements from the above groups—alkaline earth metal hydrides, such as magnesium hydride,—rare earth hydrides, such as cerium misch metal hydride,—metals, such as aluminum hydride,—transition metals such as titanium hydride, zirconium hydride, and alloys of elements from the above groups, such as iron titanium, and lantanum nickel, $AB_2$ and $AB_5$ Laves phase alloys.

METHOD FOR PREPARING A COMPOSITE OF THE FORM—P:(Q)n(Q:Y:Q)n:R

The process for producing a composite with inclusions between layers of passivating material.
1. Prepare a sample of the selected primary material with a known surface area.
2. Remove any surface oxides or contaminants from the primary material.
3. Prepare a sample of a homogenously dispersed layered passivating material Q in solution.
4. Calculate the amount of homogeneously dispersed layered material required to cover the primary material to the thickness desired according to the formula $X=S(T)n$ Where X is the amount of passivating material to be compounded.
Where S equals the estimated surface area of the selected primary material.
T equals the approximate thickness of a single molecule of the selected passivating material.
(n) equals the number of layers of Q passivating material desired.

5. Apply the passivating material to the primary material by mixing the prepared materials.
6. Dry to form the composite and to remove the solvent.
7. An optional heat treatment may be utilized at this stage to enhance the bonding of one component of the composite to another.
8. Prepare a sample of Q:Y:Q homogeneously dispersed layered passivating material in solution with the selected inclusion material precipitated, adsorbed, or entrapped between layers of the passivating material.
9. Calculate the amount of homogeneously dispersed layered material required to cover the primary material to the thickness desired according to the formula $X=S_C(2T)(n)$ Where X equals the amount of passivating material to be compounded.
Where $S_C$ equals the estimated surface area of the composite material prepared in step 6.
T equals the approximate thickness of a single molecule of the selected passivating material.
(n) equals the number of layers of Q:Y:Q material desired.

10. Apply the Q:Y:Q material to the prepared composite material by mixing.
11. Apply heat treatments suited to the passivating material and the inclusion material used, between applications of successivel layers of Q:Y:Q passivating material with inclusion
12. Optionally, add a finishing material, R, to the final surface of the composite.

The principal purpose for heat treating the composite between each application of new passivating material is to enhance the binding of the various components of the composite to each other. It is believed that when (Q) is a metal dichalcogenide, a portion of the dichalcogen is removed during the heating process. This may provide a more acceptable surface for the next application of (Q) to bind with.

Secondary benefits achieved by the application of heat treatments may include, heating to remove unnecessary materials from inclusion compounds, (for example a composite with an inclusion (Y) of a metal chloride may be heated to remove the chloride and evolve the metal), heating to polymerize an inclusion material, and others.

The selection of a suitable heat treatment for the composite will be readily apparent to those skilled in the art, and is directly dependent on the nature of the materials selected for primary, passivating, and inclusion. Further, the treatments selected may be any of those known in the art, such as calcining, sintering, annealing, heating to polymerize, or others. The composite material may be heat treated in an appropriate, selected environment, such as under air, inert gas, reducing gas, vacuum, pressurized gas, or others.

After the application of a suitable heat treatment a second or successive bi-layers of passivating material with or without inclusion materials may be applied.

A mixture of dissimilar passivating materials such as suspensions containing $MoS_2$ and $WS_2$ may be applied to the primary material in combination or each may be applied individually in successive layers provided that when applied in successive layers a suitable heat treatment is performed between the application of one form of passivating material and another form.

Passivating material with dissimilar inclusions may be applied, for example, a composite with an $MoS_2$ passivating component with a ferrocene inclusion may be suitably heat treated and a bi-layer of $MoS_2$ passivating material with styrene inclusions may be applied.

Successive layers of passivating material with or without inclusions may be incorporated in the composite provided that suitable heat treatments are performed between the application of each successive layer or group of layers and also provided that heat treatments performed on the composite for a successive layer do not damage the materials applied in a previous layer.

The specific sequence of steps outlined is meant as a general guide and variations on the sequence as would be apparent to those skilled in the art are within the scope of this disclosure.

EXAMPLE 2

Preparation of Composite with Successive Layers of Dissimilar Passivating Materials with Dissimilar Inclusion Materials Included in the Passivating Material Samples of powdered magnesium hydride (P) and a solution containing a homogenous dispresion of $WS_2$ passivating material (Q) where (n)=approximately 50 were compounded according to methods described in example 1 above. The resulting composite was placed in a stainless steel pressure container. The composite was heated to 525° C. under hydrogen at 34 atmospheres and allowed to cool to ambient temperature of approx. 20° C. The pressure container was opened and a distinct odor of hydrogen sulfide was noted. Approximately 10 layers (n)=10 of single layer $MoS_2$ passivating material (Q) with nickelous nitrate inclusions (Y) prepared by known methods were compounded by mixing under hexane with the heat treated composite. The hexane was decanted and the material was dried at 100° C. in room air. The resulting composite was replaced in the stainless steel pressure container and annealed at 300° C. in hydrogen. On cooling, the prepared composite material was vigorously mixed with approximately 4 mil of the $MoS_2$ suspension with methyl methacrylate monomer inclusions (Y) and heated in an oven at 100° C. for 10 hours. The resuting composite with polymer and metal inclusions was coated by spraying with (R) a mixture of carbon black and methyl methacrylate monomer. The material produced was pressed into a nickel screen and heated at 100° C. under vacuum for 10 hours to form a sheet.

As is well known in the art, the addition of a surface modifier (R) may be beneficial for many reasons, such as increased conductivity, improved mechanical properties, improved catalytic behavior, and many others. The method selected for the application of a given surface modifier to the composite is largely dependent on the surface material selected and may include any of the known methods, such as brushing, electroplating, rolling, pressing, sputtering, vacuum or vapor deposition, or others.

EXAMPLE 3

A 100 mg sample was selected the of powdered zinc/tungsten disulfide composite material prepared as described in example 1. The powder was inserted into a pumpable container and the gases evacuated. The container was sealed and immersed in a solution containing the surface material of interest, cobaltous nitrate in this example. The seal was opened and the solution coated the surface of the composite. The resutling composite was heated under reducing gas and vacuum to remove the nitrate.

IMPROVED ELECTRODE

The passivation material component of the composite is ionically conductive and acts essentially as a barrier between the electrochemical primary material of the electrode and the electrolyte. Thus, it serves several beneficial purposes, for example, the majority of the oxidation/reduction occurs on the surface of the passivation material, rather than on the surface of the electrochemical primary material. Thus, by preventing or reducing the formation of oxides or hydroxides on the surface of the material, there is no decrease in the active area of the electrode. In other words, the available area for the oxidation/reduction reaction remains unreduced. Further, since there is no decrease in the total area of the electrode (since no oxides or hydroxides are formed) over which current is distributed, the current density at the surface is not increased.

Referring to FIG. 2 a comparison of a $LaNi_5$ electrode and a composite $LaNi_5/MoS_2$ electrode where (P) is $LaNi_5$ (Q) is single layer $MoS_2$ and (n) =approximately 50 and (R) is super carbon black is depicted.

Both electrodes contained approximately 85 milligrams of active material. Both electrodes were coated with a measured amount of super carbon black. Electrodes were formed by mixing the active material with a suitable polymer binder to form a paste and spreading the paste on a nickel mesh current collector. Sealed cells were formed using 6 molar KOH electrolyte, a suitable separator material and a nickel oxy-hydroxide positive electrode. Both cells thus formed were charged at a constant 20 milliamps for 1 hour and discharged at a constant 20 milliamps to a cutout voltage of 0.8 volts.

Number 71 indicates the capacity of the $LaNi_5$ electrode in milliamp hours after 10 cycles. Number 72 indicates the capacity of the $LaNi_5$ electrode in milliamp hours after 35 cycles. Number 81 indicates the capacity of the $LaNi_5/MoS_2$ composite electrode after 10 cycles. Number 82 indicates the capacity of the same electrode after 35 cycles.

After 35 cycles the cells were allowed to rest for seven days and thus allow time for the growth of oxide and/or hydroxide films on the surface of the electrodes. The charge and discharge cycles as described above were begun again after the seven day rest. The effects of this film formation can readily be seen on the $LaNi_5$ electrode.

Number 73 indicates the capacity of the $LaNi_5$ cell on the 36th cycle. Number 83 indicates the capacity of the cell with the composite electrode on the 36th cycle.

Thus it can be readily seen that the composite material exhibits a clear ability to inhibit the growth of detrimental surface films.

As is apparent in FIG. 2, it has also been found that the compounded layer of passivation material consistently contributes to increased energy density for electrochemical cells incorporating the composite with a metal hydride or hydrogen storage alloy utilized as a primary electrochemical material. This is may be due to the fact that hydrogen will react with, for example, an exfoliated transition metal dichalcogenide passivation material much more quickly then the metal hydride material.

An improved metal hydride electrode material may thus be produced by forming a composite where (P) is a metal hydride or metal hydride alloy capable of reversibly occluding hydrogen (Q) is a single layer transition metal dichalcogenide (n) is a number between 1 and 1000 and preferably between 10 and 100 and (R) is carbon.

An improved metal hydride electrode may be produced by mixing said composite with a suitable binder material and applying the resulting paste to a suitable current collector.

EXAMPLE 4
Preparation of Electrodes

A 1.0 gram sample of LaNi$_5$/MoS$_2$ composite where (P) is LaNi$_5$ (Q) is single layer MoS$_2$ and (n) is approximately 50 was prepared as described in example 1 above. The sample was coated uniformly with (R) a 50 mg sample of super carbon black. 1.0 ml of a binder solution containing 9.4% by weight PVDF (polyvinyllidene fluoride) in NMP (1-methyl-2-pyrrolidinome) was mixed with the composite thus formed, along with an excess of approximately 1.0 ml NMP to form a paste. The paste was then spread using a doctor blade spreader on to a nickel mesh to from an electrode with an area of 1×1.5 cm$^2$. The electrode was dried at temperature of 100° C. in vacuum for one hour. The mass of the finished electrode was 100 mg. the estimated weight of the active material was 85 mg. The composite electrode was formed into a cell with a suitable separator and NiOOH cathode and 6M KOH electrolyte and sealed in a container.

IMPROVED HYDROGEN OCCLUDING MATERIAL

Metal hydride, hydrogen occluding materials typically suffer contamination when exposed to atmospheres containing even small amounts of nitrogen, carbon dioxide, carbon monoxide, oxygen, and other gases.

Referring to FIG. 3 a comparison of a magnesium hydride material and a Mg hydride/MoS$_2$ hydrogen occluding composite, where (P) is magnesium hydride, (Q) is single layer MoS$_2$ and approximately (n)=10 is depicted.

Both the magnesium hydride and the composite material were exposed to atmosphere. The materials were then placed into pumpable containers fitted with temperature and pressure sensors and the containers were evacuated for several hours. Industrial grade hydrogen was admitted to the containers at 34 atm. The containers were sealed and heated and the adsorption of hydrogen by the material was measured.

Number 91 indicates the hydrogen adsorbed by the magnesium hydride as a percentage of the weight of the sample, at temperatures ranging from 20° C. to 350° C. Number 101 indicates the hydrogen adsorbed by the composite material as a percentage of weight of the sample, at the same temperatures.

It can readily be seen that the composite material is resistant to contamination at atmospheric pressure and typical ambient temperatures and, therefore, even highly reactive hydrides may be stored and handled for extended periods of time in atmosphere and used immediately without reconditioning.

In addition the catalytic effect of the preferred single layer MoS$_2$ passivating material is quite pronounced. As can be seen in reference to FIG. 3, composites formed with hydride metals such as magnesium, which typically require temperatures of approximately 300° C. to effect hydrogen adsorption, can readily adsorp hydrogen at 20° C.

This catalytic effect may be further enhanced by the application of a surface modifier like platinum or palladium.

An improved hydrogen occluding composite material may thus be produced by forming a composite where (P) is a metal hydride or metal hydride alloy capable of reversibly occluding hydrogen (Q) is a single layer transition metal dichalcogenide (n) is a number between 1 and 100 and preferably between 1 and 10 and (R) is platinum or palladium.

EXAMPLE 5
Preparation of Hydrogen Occluding Composite

A 250 mg sample of magnesium hydride (P) was fully hydrided and compounded with approximately (n)=10 passivating layers of exfoliated MoS$_2$ (Q) as described above in Example 1. The composite thus formed was placed into a container, the container evacuated, and the composite heated to 280° C. to desorp occluded hydrogen. A dilute suspension containing fine particles of powdered platinum (R) was introduced into the evacuated container and allowed to coat the composite. The material was heated under vacuum to remove the suspension liquid. The resulting composite was removed from the container and exposed to atmosphere at approximately 20° C. for 3 days. The composite was pelletized and placed into a pressure resistant cylinder and exposed to industrial grade hydrogen gas obtained from Praxair Company at 34 Atm. Hydrogen adsorption was repeatedly measured at various temperatures. Hydrogen adsorbtion of the composite was measured and found to be on average approximately 1.5% by weight at 20° C. and approximately 7.6% by weight at 350° C.

ELECTROCHEMICAL CELL

Referring now to FIG. 2, there is illustrated therein a schematic representation of a electrochemical cell including a composite electrode comprised of electrochemical primary material and a layer of a passivation material in accordance with the instant invention. The electrochemical cell 110 includes a negative electrode 120 and a positive electrode 130. Both electrodes are immersed in an electrolyte 140 and separated from one another by an appropriate separator 150.

The negative electrode 120 of the electrochemical cell 110 is the composite electrode. The positive electrode 130 may be fabricated of any of the number of materials known to be suitable for the purpose. In one preferred embodiment, a positive electrode may be a nickel oxyhydroxide positive electrode. However, other suitable cathode materials may be employed.

The negative and positive electrodes 120 and 130 respectively, are immersed in electrolyte 140. The electrolyte may be an electrolyte known in the art, such as, for example, 31% KOH. Disposed between the negative and positive electrodes is a separator 150 fabricated of, for example, a polymeric material, such as one or more layers of, or a combination of non-woven or microporous polypropylene (Celgard).

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims;

I claim:

1. A metal-based material having a microstructure of the form P:(Q)n
    wherein P is a substance selected from the group consisting of alkaline earth metals, rare earth metals, transition metals, alkaline earth metal hydrides, rare earth metal hydrides, transition metal hydrides, alkaline earth metal alloys, rare earth metal alloys, transition metal alloys, and mixtures thereof;
    Q is a layered transition metal chalcogenide material between one and one hundred molecules thick; and
    n is a number corresponding to the number of layers of Q within the structure.

2. A composition according to claim 1, wherein P is the primary electrochemical storage components of composite and said dispersed material is separated into defined layers while suspended in a solution.

3. A composition according to claim 1, wherein P is the primary hydrogen occluding component of the composite and said dispersed material is separated into defined layers while suspended in a solution.

4. A composition according to claim 1, wherein P is both the primary electrochemical storage and the primary hydrogen occluding component of the composite and said dispersed material is separated into defined layers while suspended in a solution.

5. A composition according to claim 1, wherein P is a powder and said dispersed material is separated into defined layers while suspended in a solution.

6. A composition according to claim 1, wherein the particle size of the P is between 500.0 and 0.1 microns and said dispersed material is separated into defined layers while suspended in a solution.

7. A composition according to claim 1, wherein the structure of the particle of P is nanocrystalline and said dispersed material is separated into defined layers while suspended in a solution.

8. A composition according to claim 1, wherein, Q is selected from the group comprised of metal dichalogenides and said dispersed material is separated into defined layers while suspended in a solution.

9. A composition according to claim 8, wherein, Q is selected from the group comprised of $MoS_2$, $NbS_2$, $TaS_2$, $TiS_2$, $VS_2$, and $WS_2$ and combinations thereof.

10. A composition according to claim 9, wherein, selenium replaces sulfur as the dichalcogen.

11. A composition according to claim 8, wherein, Q is obtained from a homogenous dispersion of transition metal dichalcogenide in solution, wherein the transition metal dichalcogenide have separated into defined single layers, said defined single layers corresponding to a thickness of approximately one molecule of the suspended transition metal dichalcogenide.

12. A composition according to claim 8, wherein, Q is obtained from a homogenous dispersion of transition metal dichalcogenide in solution, wherein the transition metal dichalcogenide form sheets having a "rag-like" structure representing a system consisting of single or several stacked but randomly folded and disordered layers.

13. The material of claim 1, wherein (Qn) is of the form; $(\phi)n:(\phi:Y:\phi)y:R$ wherein $\phi$ is a layered transition metal chalcogenide material;

Y is an inclusion material located between layers of $\phi$;

R is a surface modifier applied to the final surface of the composite;

n represents the number of layers of $\phi$ in the structure; and y represents the layers of ($\phi:Y:\phi$) in the structure.

14. A composition according to claim 13, wherein P is the primary electrochemical storage component of the composite.

15. A composition according to claim 13, wherein P is the primary hydrogen occluding component of the composite.

16. A composition according to claim 13, wherein P is both the primary electrochemical storage and hydrogen occluding component of the composite.

17. A composition according to claim 13, wherein P is a powder.

18. A composition according to claim 13, wherein the particle size of the P is between 500.0 and 0.1 microns.

19. A composition according to claim 13, wherein the structure of the particle of P is nanocrystalline.

20. A composition according to claim 13, wherein, Q is selected from the group comprised of metal dichalcogenides.

21. A composition according to claim 20, wherein, Q is selected from the group comprised of $MoS_2$, $NbS_2$, $TaS_2$, $TiS_2$, $VS_2$, and $WS_2$ and combinations thereof.

22. A composition according to claim 21, wherein, selenium replaces sulfur as the dichalcogen.

23. A composition according to claim 20, wherein, Q is obtained from a homogenous dispersion of transition metal dichalcogenide in solution, wherein the transition metal dichalcogenide have separated into defined single layers, said defined single layers corresponding to a thickness of approximately one molecule of the suspended transition metal dichalcogenide.

24. A composition according to claim 20, wherein, Q is obtained from a homogenous dispersion of transition metal dichalcogenide in solution, wherein the transition metal dichalcogenide form sheets having a "rag-like" structure representing a system consisting of single or several stacked but randomly folded and disordered layers.

25. A composition according to claim 13, wherein Y is selected from the group comprised of metallocenes, dyes, liquid crystals, monomers, carbonyls, soluble hydrides, organic solutes, and precipitates of soluble salts selected from the group consisting of metal nitrates, sulfides, and chlorides.

26. A composition according to claim 13, wherein R is selected from the group comprised of $MX_2$, where $MX_2$ is a layer-type dichalcogenide such as $MoS_2$, $NbS_2$, $TaS_2$, $TiS_2$, $WS_2$, $VS_2$, or the like, and F where F is a coating applied to the surface of the composition.

27. A method of preparing a composition of the form $$P:(Q)n$$

comprising the steps of:

(a) removing oxides and contaminants from a surface of a measured quantity of P where P is a substance selected from the group comprised of alkaline earth metals, rare earths, metals, transition metals, including combinations, hydrides and alloys thereof;

(b) preparing homogeneously dispersed, layered Q, suspended in a protic solvent where Q is a homogenous dispersion of a layered material, said dispersed material being separated into defined layers while suspended in a solution, wherein the defined layers correspond to a thickness of between one and one hundred molecules of said layered material, and n is a number corresponding to the number of layer, of Q;

(c) measuring an amount of Q in accordance with the formula, $X=S(T)(n)$, where X is the quantity of material to be compounded, S is the estimated surface area of the measured quantity of P primary material, T, is the approximate thickness of a single molecule of the selected Q passivating material, and n is the number of desired layers of said passivating material; and (d) submerging both the measured quantity of P and the measured amount of Q under an aprotic solvent;

(e) mixing P and Q together and;

(f) drying, to both form the composite and remove said solvents.

28. A method according to claim 27, wherein said protic solvent is water.

29. A method according to claim 27, wherein said aprotic solvent is nonaqueous and anhydrous.

30. A method according to claim 27, wherein said removing step includes annealing P in a reducing environment and repeating this process at least twice.

31. A method according to claim 27, wherein said primary material is sorted according to particle size prior to said mixing step.

32. A method according to claim 27, including heat treating the compounded material to enhance binding of the primary material, P, and the passivating material, Q, to one another.

33. A method according to claim 27, wherein a combination of forms of, Q, passivating materials are simultaneously compounded with P.

34. A method according to claim 27, wherein a combination of forms of Q, passivating material are successively compounded with P.

35. A method of preparing a composition of the form

P:(Q)n:(Q:Y:Q)x:R comprising the steps of:
(a) removing oxides and contaminants from a surface of a measured quantity of P where P is a substance selected from the group comprised of alkaline earth metals, rare earths, metals, transition metals, including combinations, hydrides and alloys thereof;
(b) preparing homogeneously dispersed, layered Q, suspended in a protic solvent where Q is a homogenous dispersion of a layered material, said dispersed material being separated into defined layers while suspended in a solution, wherein the defined layered correspond to a thickness of between one and one hundred molecules of said layers material, and n is a number corresponding to the number of layers of Q;
(c) measuring an amount of Q in accordance with the formula, X=S (T) (n), where X is the quantity of material to be compounded, S is the estimated surface area of the measured quantity of P primary material, T, is the approximate thickness of a single miolecule of the selected Q passivating material, and n is the number of desired layers of said passivating material; and
(d) submerging both the measured quantity of P and the measured amount of Q under an aprotic solvent;
(e) mixing P and Q together and;
(f) drying, in order to both form the composite, and to remove said solvents, and;
(g) heating, to enhance bonding between P and Q, and;
(h) preparing a measured amount of Q:Y:Q in a protic solution, where Y is a material selected from the group comprised of metallocenes, dyes, liquid crystals, monomers, carbonyls, soluble hydrides, organic solutes, and precipitates of soluble salts selected from the group consisting of metal nitrates, sulfides, and chlorides, which have been precipitated, adsorbed, or entrapped between layers of said Q;
(i) mixing the Q:Y:Q with the prepared P:Q(n) composite while immersed in an aprotic solvent, where x is a number corresponding to the number of layers of Q:Y:Q
(j) heating the material produced, to form the new composite, and
(k) applying a coating, R, to the final surface of the composite where R is a material applied to the surface of the composite and selectecd from the group comprised of $MX_2$, where $MX_2$ is a layer-type dichalcogenide such as $MoS_2$, $NbS_2$, $TaS_2$, $TiS_2$, $WS_2$, $VS_2$, or the like, or F where F is a coating applied to the surface of the composition.

36. A method according to claim 35, wherein said protic solvent is water.

37. A method according to claim 35, wherein said aprotic solvent is nonaqueous and anhydrous.

38. A method according to claim 35, wherein said removing step includes annealing P in a reducing gas environment and repeating this process at least twice.

39. A method according to claim 35, wherein said primary material is sorted according to partical size prior to said mixing step.

40. A method according to claim 35, including heat treating the compounded material to enhance binding of the said primary material, P, and the said passivating material, Q, to one another.

41. A method according to claim 35, wherein a plurality of forms of said, Q, passivating materials are simultaneously compounded with said P.

42. A method according to claim 35, wherein a plurality of forms of said, Q, passivating material are successively compounded with said P.

43. A method according to claim 35, wherein a plurality of forms of said, Q:Y:Q passivating material with inclusions are successively compounded with said material P:Q(n).

44. A method according to claim 35, wherein said R is applied to the surface of said material P:(Q)n:(Q:Y:Q)x.

45. A composite according to claim 1 wherein said composite is an elctrode material for use as a negative electrode for an electrochemical cell, and wherein said composition is of the formula P:(Q)n:R, where R is a material applied as a surface modifier to final surface of the composite.

46. A composition according to claim 44, wherein, Q is obtained from a homogenous dispersion of exfoliated transition metal dichalcogenides of the form $MX_2$, where $MX_2$ is a layer-type dichalcogenide selected from the group consisting of $NbS_2$, $MoS_2$, $TaS_2$, $TiS_2$, $VS_2$, and $WS_2$.

47. A composite material according to claim 44, wherein said passivating material is hydrogen permeable and inhibits the formation of oxides and hydroxides on the surface of said primary material.

48. A composition according to claim 44, wherein, (P) is $LaNi_5$, (Q) is $MoS_2$, (n)equals a number between 1 and 1000, and R is carbon.

49. A coinposite according to claim 1 wherein said composite is a hydrogen occluding material for use as a storage medium for gaseous hydrogen, and wherein said composition is of the formula P:(Q)n:R, where R is a material applied as a surface modifier to final surface of the composite.

50. A composition according to claim 49, wherein, Q is obtained from a homogenous dispersion of exfoliated transition metal dichalcogenides of the form $MX_2$, where $MX_2$ is a layer-type dichalcogenide selected from the group consisting of $NbS_2$, $MoS_2$, $TaS_2$, $TiS_2$, $VS_2$, and $WS_2$.

51. A composition according to claim 49, wherein, the composite material formed is resistant to contamination by atmospheric gases.

52. A composition according to claim 49, wherein, (P) is magnesium hydride, (Q) is $MoS_2$, (n) is a number between 1 and 100, and R is selected from the group comprised of palladium and platinum.

53. A composition according to claim 1 wherein said compostion is formed as a negative electrode in an electrochemical storage cell having a common electrolyte immersing therein said negative electrode and a postion electrode spaced apart from said negative electrode.

* * * * *